(12) United States Patent
Wilson et al.

(10) Patent No.: US 7,520,741 B2
(45) Date of Patent: Apr. 21, 2009

(54) REPLACEABLE MOLD CAVITIES

(75) Inventors: Robert A. Wilson, Sagamore, MA (US); Ajay Vora, Randolph, MA (US)

(73) Assignee: Acushnet Company, Fairhaven, MA (US)

(*) Notice: Subject to any disclaimer, the term of this patent is extended or adjusted under 35 U.S.C. 154(b) by 535 days.

(21) Appl. No.: 11/490,957

(22) Filed: Jul. 21, 2006

(65) Prior Publication Data
US 2008/0020081 A1    Jan. 24, 2008

(51) Int. Cl.
*B29C 45/14*    (2006.01)

(52) U.S. Cl. ............. 425/195; 29/525.11; 249/102

(58) Field of Classification Search ........... 425/192 R, 425/195, 116; 249/102; 29/525.11
See application file for complete search history.

(56) References Cited

U.S. PATENT DOCUMENTS

| | | | |
|---|---|---|---|
| 2,881,478 A * | 4/1959 | Gruenberg ............ 425/195 |
| 4,508,309 A | 4/1985 | Brown |
| 4,622,001 A * | 11/1986 | Bright et al. ............ 425/549 |
| 5,006,297 A | 4/1991 | Brown et al. |
| 5,288,222 A * | 2/1994 | Wieser ............ 425/190 |
| 5,725,891 A | 3/1998 | Reid, Jr. |
| 5,795,529 A | 8/1998 | Reid, Jr. |
| 6,033,724 A | 3/2000 | Molitor |
| 6,042,768 A | 3/2000 | Calabria et al. |
| 6,171,091 B1 | 1/2001 | Bettencourt |
| 6,319,446 B1 | 11/2001 | Bettencourt |
| 6,358,031 B1 | 3/2002 | Kikuchi et al. |
| 6,439,873 B1 | 8/2002 | Marshall |
| 6,726,869 B2 | 4/2004 | Aoyama et al. |
| 2003/0167622 A1 * | 9/2003 | Cook ............ 29/525.11 |

* cited by examiner

*Primary Examiner*—Robert B Davis
(74) *Attorney, Agent, or Firm*—D. Michael Burns

(57) ABSTRACT

A replaceable cavity insert for use in a multi-cavity compression mold, wherein each cavity insert is friction fitted into a respective mold recess. Each insert has a substantially semi-spherical insert surface and defined in the surface is an inverted dimple pattern of a golf ball. Each cavity insert has an O-ring recessed in the upper perimeter to limit the flow of heating and cooling fluids beyond the perimeter. The cavity insert and the O-ring are retained in the recess of the frame by a pair of removable cavity retainer screws and washers, which are countersunk into the frame and have an edge of the washer disposed in a cut-out section of the insert. Each cavity insert may be separately and individually removed from the frame by just loosening the retaining screws without the need to remove the entire frame from the press or disconnecting the utility lines leading to the frame.

12 Claims, 4 Drawing Sheets

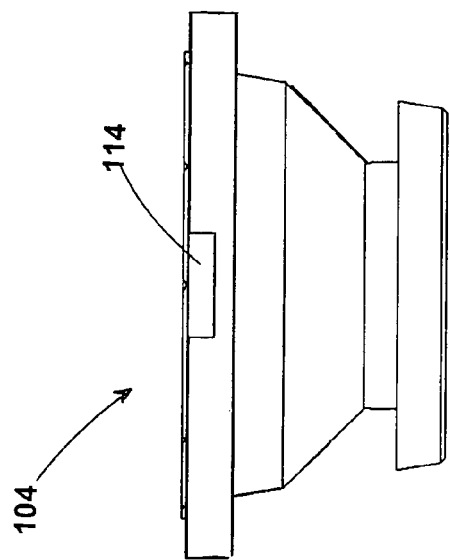
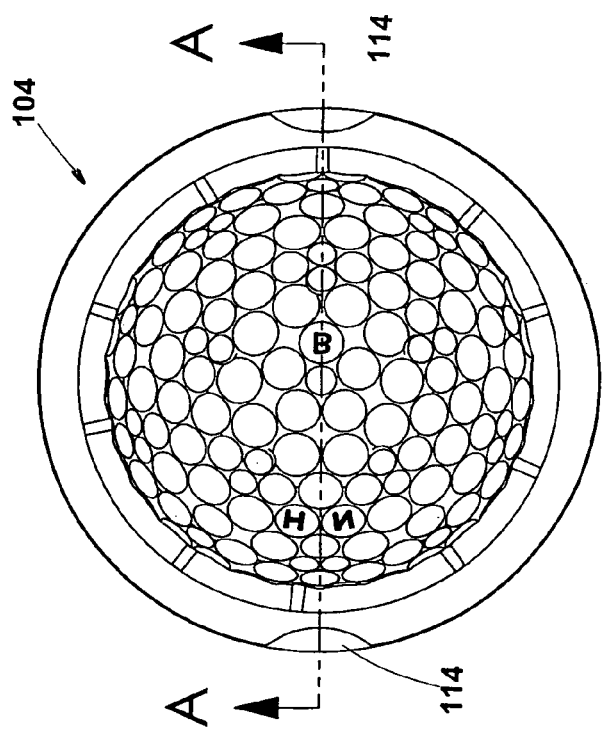
Fig. 4
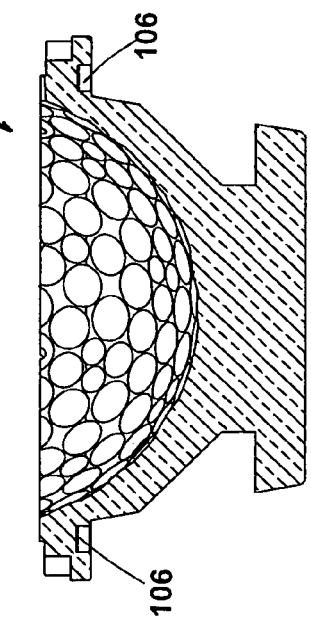
Fig. 5
Fig. 6

US 7,520,741 B2

REPLACEABLE MOLD CAVITIES

FIELD OF THE INVENTION

The present invention is directed to golf ball mold cavity inserts, specifically cavity inserts used in compression molding processes. More specifically, the present invention relates to cavity inserts that may be quickly and individually replaced.

BACKGROUND OF THE INVENTION

The present invention relates to an improvement to molds such as that disclosed in U.S. Pat. No. 4,508,309 issued to Robert A. Brown, and U.S. Pat. No. 5,795,529 issued to Walter L. Reid, Jr., all of which were assigned to Acushnet Company and are incorporated herein by reference. The patents disclosed in prior art mold frames typically contain a plurality of cavities therein, which accommodate golf ball half-molds and are disposed in a closely packed arrangement.

Mold cavities are use to manufacture the dimpled cover portions of golf balls. The shapes, dimensions, and pattern of the dimples significantly contribute to aerodynamic performance of the ball as shown by wind tunnel testing and performance testing using robots and golfers. Achieving the desired aerodynamic performance properties requires the ability to produce such dimensions and shapes consistently. Because a golf ball receives its dimples from a molded cavity, the integrity and characteristics of the dimples formed on the golf ball are dependent upon the accuracy of the mold cavity from which the dimples are formed.

Typical compression mold frames generally include a plurality of bores and channels which penetrate through respective rows of cavities, and are fed by utility inlet lines for receiving a thermal medium such as steam or cooling fluid. Inlet lines are typically disposed at one end of a bore and an outlet is disposed at the end of the bore at an opposite side of the mold frame. The mold frame includes cross bores on opposite ends of the cavity rows for providing fluid communication between the bores. The ends of each bore and cross-bore, except for the inlets and the outlets, may be plugged to selectively block the cross-bores to create a serpentine series flow of the thermal medium through the adjacent cavities. The prior art discloses a variety of flow patterns for the cooling and heating mediums.

Whatever the flow characteristics of the particular mold frame, the cavities of prior art mold frames periodically need to be replaced, due to wear or breakage. Because of the construction and placement of the O-rings, it is necessary to remove the entire mold frame which includes disconnection all the utility lines entering and exiting the frame. This creates a significant production downtime.

When a golf ball is made using a molding process such as compression molding, two oppositely facing mold halves are used, an upper mold half and a lower mold half, with each mold half having a hemispherical, inversely dimpled mold cavity formed out of metal. Each mold half is approximately one half of the size of a finished ball. It is an industry standard to make inversely dimpled mold cavities out of metal, typically brass. A metal like brass is chosen primarily because of durability, mechanical strength, efficient thermal transfer, and ability to withstand higher pressures and temperatures without deforming. When the two mold halves are put together form an internal cavity that is generally spherical with an internal cavity that is generally spherical with an inversely dimpled pattern representing the negative image of the dimple pattern that will be produced on the golf ball formed therein.

Traditionally, in the multi-cavity compression molding of a golf ball cover or inner layer, each mold cavity is fitted with a pair of O-rings, one on each side of the utility to allow faster heating and cooling of the cavities to prevent leakage out of the mold surfaces. As previously stated, this O-ring(s) concept makes quick changing of cavities for the product changeover (dimple changes) or replacement of one or more damaged cavities very difficult. The most common reason for changing out a cavity is because of insufficient mold release which causes the product to stick.

The second most significant reason for needing quick changing cavities is that the cavities must be periodically treated with a release agent to enable the easy release of the golf ball product from the cavity. These release agents are of two types. The first type is a more permanent release agent which needs to be baked-on and requires baking temperatures in the 600° F. to 750° F. range. This release agent is more effective and doesn't transfer to the product. Since the O-rings are mounted on the side of the mold, and since they cannot sustain these high temperatures, the complete disassembly of all the mold cavities and removal of all O-rings is required to apply a permanent baked-on release agent. Because the production downtime caused by shutting down the hydraulic press, disconnecting the utilities to the frame, and removing the entire frame to apply the permanent release agent has been such an inconvenience, a second type of release agent has become popular and is widely used. This second type of release agent is sprayed on at the reduced temperature of between 250° F. to 350° F. which will not damage the O-rings. While this semi-permanent (sacrificial) release agent may be convenient, the procedure must be repeated often (some times every hour) and it allows the transfer some of the agent to the molded ball thereby causing significant adhesion related problems during finishing operations such as printing or painting. There is a real need for using the permanent baked-on release agent without shutting the entire operation down to change out the mold frame.

The present invention provides for a mold cavity that allows a quick changeover of the cavities, and also allows for an easy method of applying a baked-on mold release without having to remove the mold frame from the press.

SUMMARY

The present invention relates to replaceable cavity inserts for use in a multi-cavity compression mold, wherein each cavity insert comprises a tapered construction for friction fitting into a respective recess defined in the compression mold frame. Each insert has a substantially semi-spherical insert surface and defined in the surface is an inverted dimple pattern of a golf ball. Each cavity insert has an O-ring recessed in the upper perimeter to limit the flow of heating and cooling fluids beyond the perimeter. The cavity insert and the O-ring are retained in the recess of the frame by a pair of removable cavity retainer screws and washers, which are countersunk into the frame and have an edge of the washer disposed in a cut-out section of the insert. Each cavity insert may be separately and individually removed from the frame without the need to remove the entire frame from the press or disconnecting the utility lines leading to the frame.

By allowing for the quick removal of individual insert cavities, the cavity surfaces may have the preferred baked-on release applied rather than the sacrificial sprayed-on release. The reason for sprayed-on release agents is that they may be applied at a low temperature (250° F.-350° F.) which is made necessary because of damage to the O-rings if they are present. By being able to remove cavity inserts individually, and also the O-ring, it is possible to apply the more effective baked-on release agent at the 600° F. to 750° F. temperature.

The present invention is preferably utilized for casting a cover or intermediate layer on a golf ball subassembly.

BRIEF DESCRIPTION OF THE DRAWING

FIG. 4 is a top plan view of the cavity insert.

FIG. 5 is a side elevation view of the insert.

FIG. 6 is a cross-sectional view of the cavity insert taken along line A-A of FIG. 4.

DETAILED DESCRIPTION OF EMBODIMENTS

Figure 1:
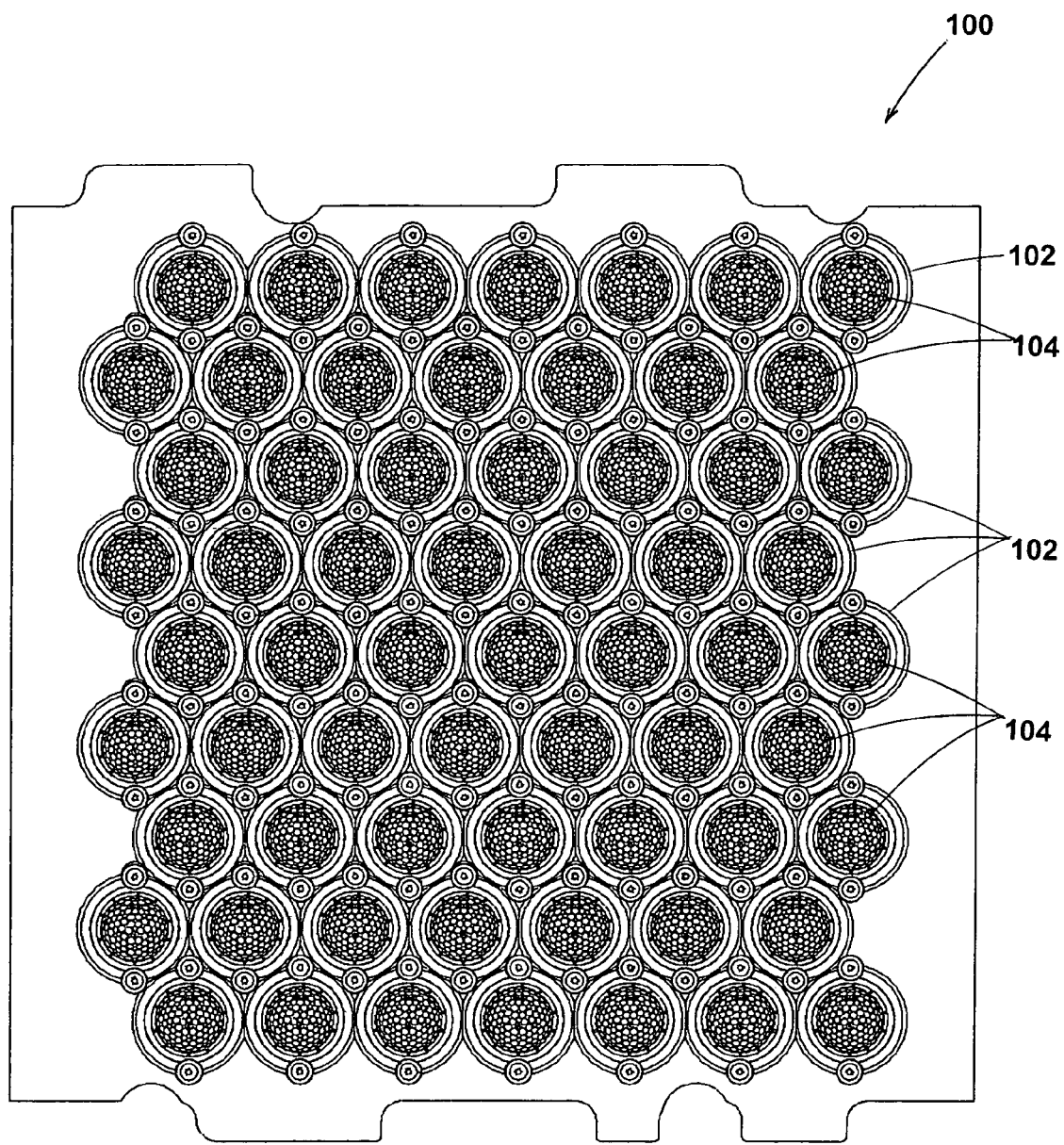
FIG. 1 is a top view of a typical multi-cavity compression mold frame.
Figure 2:
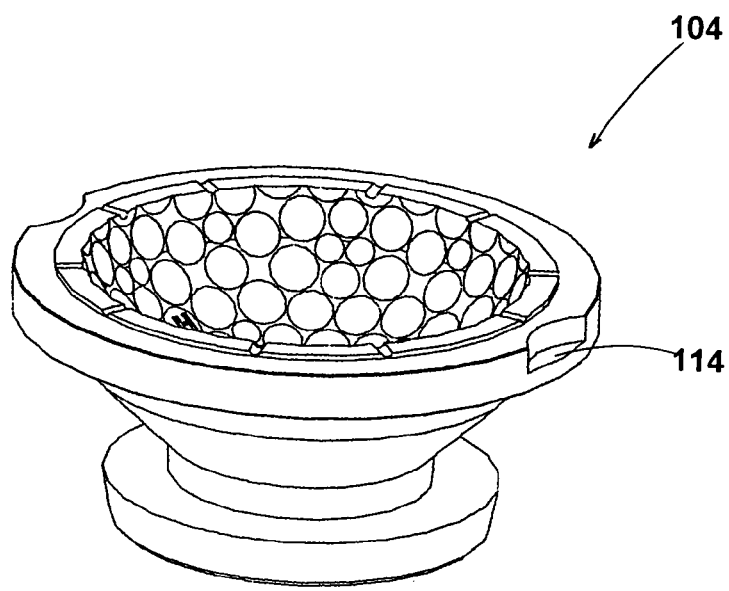
FIG. 2 is a top perspective view of the cavity insert of the present invention.
Figure 3:
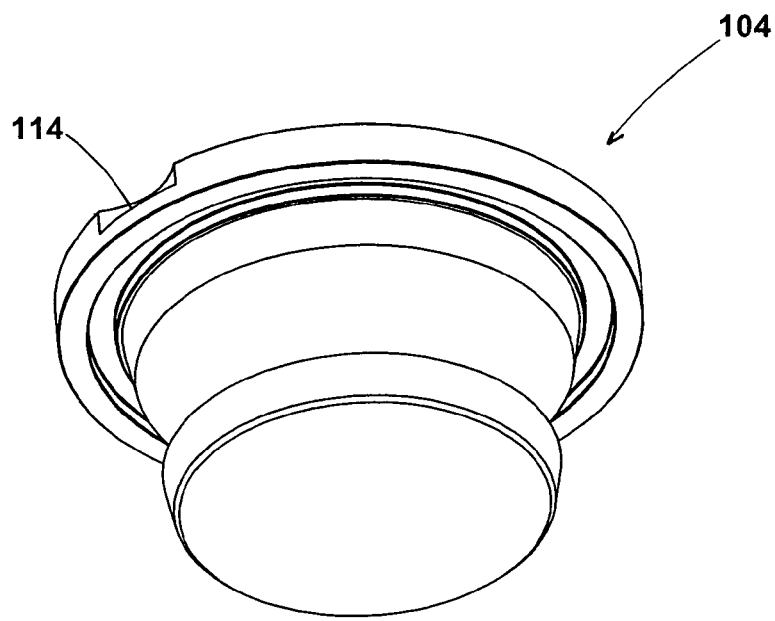
FIG. 3 is a bottom perspective view of the cavity insert.
Figure 7:
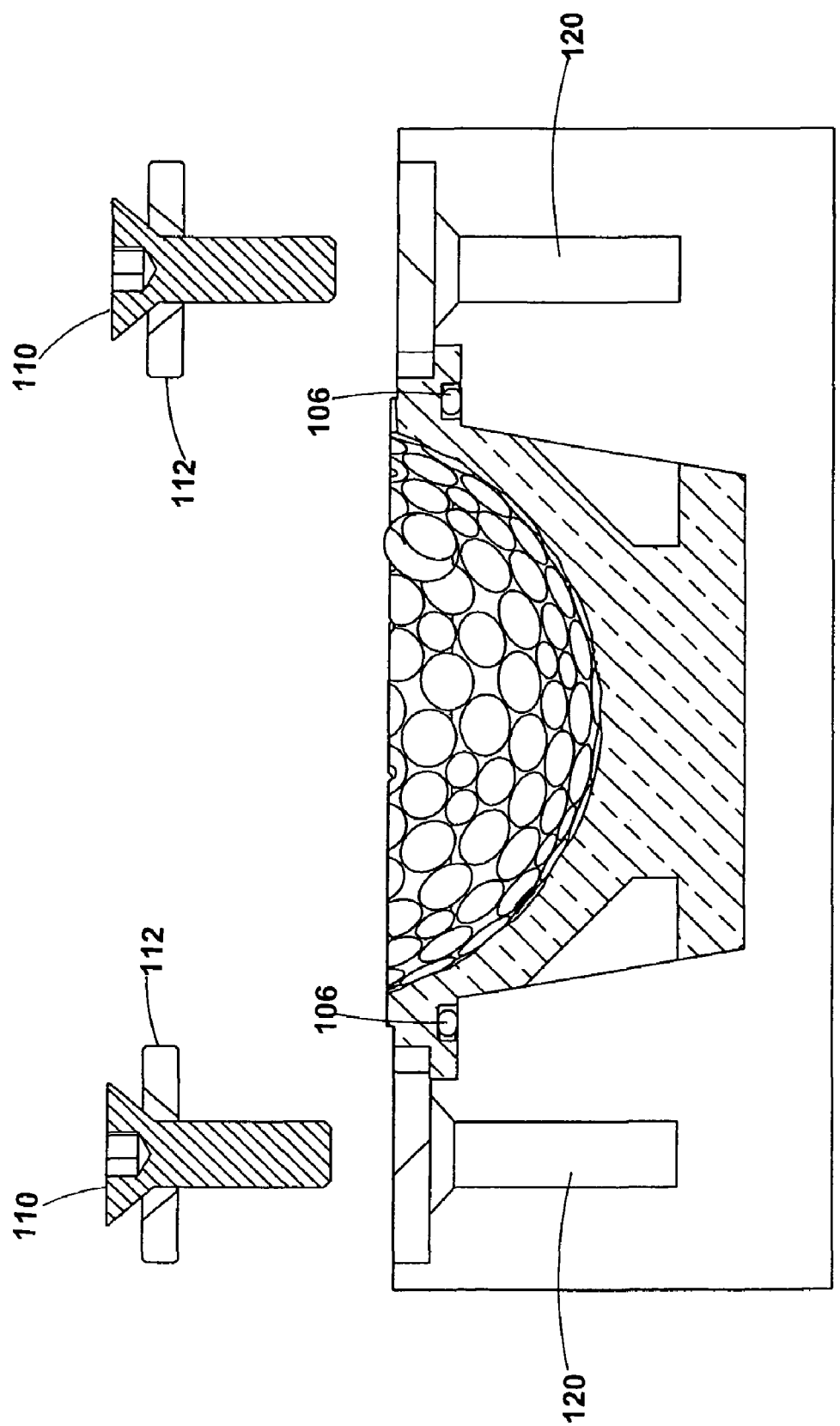
FIG. 7 is a cross-sectional view of the insert installed in a mold frame.

FIG. 1 discloses a typical mold frame 100 according to the present invention. The mold frame 100 includes a plurality of recesses 102 for accommodating rows of golf ball cavity inserts 104 that are disposed in a closely packed arrangement. Not shown are bores and channels for fluid communication between each adjacent cavity in the rows. Thermal mediums such as steam, hot liquid, or cooling liquid, can be introduced to the mold for heating and cooling each cavity insert 104 as required. The mold frame 100 includes a plurality of inlets (not shown) that are connected to utilities. The prior art presents numerous methods of configuring the flow of the heating and cooling mediums, such as those discussed in U.S. Pat. Nos. 5,795,529 and 5,725,891 which were assigned to Acushnet Company and are incorporated herein by reference. The inventive concept of the present invention discloses a replaceable and quick-change cavity insert 104 that replaces the typical half mold that is used in prior art compression molds. As stated above, the removal of prior art half molds from compression mold frames involves removing the entire mold frame from the mold press and disconnecting all utility lines to it, even if only one half mold requires removal or replacement.

Prior to the present invention, there were two main reasons that necessitate the complete removal of the frame from the press mold. First, there are two O-ring seals, one on each side of the utility channel to allow faster heating/cooling of the cavities to prevent any leakage out of the mold surfaces. This O-rings concept made quick changing of cavities for product turnover (usually changing the dimple pattern of the ball) or replacement of one or more of the cavities a very difficult and time consuming procedure. Secondly, since prior art compression molds have two O-rings, and both are mounted on the side of the mold, the complete disassembly of all mold cavities and removal of all O-rings are required in order to apply baked on mold release (typically applied at temperatures of about 600° F. to 750° F.). Because of production downtime, there has been a rapid rise in the use of semi-permanent (sacrificial) type of release agents. These agents can be sprayed on at the much lower application temperatures of only 250° F. to 350° F.

FIGS. 3-7 of the present invention show a concept that will dramatically improve production downtime. When the cavity inserts 104 of the present invention require quick changing from either a top or bottom mold frame 100, each insert 104 can be removed individually by merely loosening of a couple of retaining screws 110 and washers 112 thereby removing an insert 104 without necessitating removal of the entire mold assembly from the hydraulic press (not shown). The O-ring 106 protecting the cavity insert 104 of the present invention can then be easily removed so that the high temperature baked-on mold release can be applied. The advantage of the baked-on mold release is that it virtually eliminates a major problem connected with the use of the semi-permanent types of release, which is the inherent contamination of product by the mold release agent being transferred to the golf ball parts. This is because mold release that is transferred to product causes significant adhesion related problems during finishing operations such as printing, painting, etc.

Referring to FIGS. 4-7, the cavity insert 104 of the present invention has a symmetrically tapered construction that allows it to be friction fitted into an accommodating recess 102 of the mold frame 100. The overall height of the cavity insert 104 is shorter than the mold frame recess 102 therein eliminating the need of for any bottom O-ring. The tapered shape along with the top mounted O-ring 106 allows for easy removal and replacement of any cavity insert 104. Upon releasing the cavity insert 104, the O-ring 106 is easily removed prior to the application of a mold release agent. The two screws 110 and washers 112 retain the cavity insert 104 and O-ring 106 in place. The screws 110 are countersunk into receptacles 120 in the mold frame 100. The inserts 104 have cut-out sections 114 in which a washer 112 is disposed thereof. All that is required to remove an insert 104 is a simple loosening of the screws 110.

While it is apparent that the illustrative embodiments of the invention herein fulfills the objectives of the invention, it will be understood that the appended claims are intended to cover all such modifications and embodiments which come within the spirit and scope of the present invention.

We claim:

1. A replaceable cavity insert for use in a multi-cavity compression mold, each cavity insert comprising:
   a tapered construction for friction fitting into a recess defined in the compression mold;
   each cavity insert having an arcuate inner surface defining an inverted dimple pattern of a golf ball;
   each cavity insert having an O-ring located about the perimeter of an upper section of the insert for limiting the flow of fluids beyond the perimeter;
   a pair of semi-circular cut-out sections on an upper surface of each cavity insert; and
   a pair of removable cavity retainer screws, each screw countersunk into the compression mold, an edge of the screw disposed over the cut-out section of the cavity insert to retain the cavity insert and secure the O-ring, wherein the cavity insert may be quickly and individually removed without the need to remove the entire mold or to disconnect utility lines therein.

2. The cavity insert according to claim 1, wherein a baked-on mold release is applied to the concave surface of each cavity insert at a temperature between about 600° F. to 750° F.

3. The cavity insert according to claim 1, wherein each cavity insert is made of a high thermal conductive metal.

4. The cavity insert according to claim 1, wherein the height of each cavity insert is less than the height of the corresponding recess therein only requiring the O-ring in the upper section of the insert.

5. The cavity insert according to claim 1, wherein the cavity insert is utilized for casting a cover on a golf ball subassembly.

6. The cavity insert according to claim 1, wherein the cavity insert is utilized for casting an inner layer on a golf ball subassembly.

7. A method of placing a cavity insert into a multi-cavity compression mold frame without removing the mold frame from a hydraulic press, the method comprising:
providing in the frame a tapered recess sized to accommodate the cavity insert;
inserting into the recess by friction fit the cavity insert and a single O-ring displaced about the top portion of the insert; and
retaining the insert and O-ring within the recess by a pair of threaded screws and accompanying washers,
wherein the cavity insert may be removed from the frame by loosening the screws and manually lifting the cavity insert out of the frame.

8. The method according to claim 7, wherein a baked-on mold release is applied to a concave inner surface of each cavity insert at a temperature between about 600° F. to 750° F.

9. The method according to claim 7, wherein each cavity insert is made of a high thermal conductive metal.

10. The method according to claim 7, wherein the height of each cavity insert is less than the height of the corresponding recess therein only requiring the O-ring in the upper section of the insert.

11. The method according to claim 7, wherein the cavity insert is utilized to cast a cover on a golf ball subassembly.

12. The method according to claim 7, wherein the cavity insert is utilized for casting an inner layer on a golf ball subassembly.

* * * * *